United States Patent
Yadav

(10) Patent No.: US 7,336,923 B2
(45) Date of Patent: Feb. 26, 2008

(54) METHOD, APPARATUS AND SYSTEM FOR EXTENDING WIRELESS NETWORK COVERAGE

(75) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 10/727,943

(22) Filed: Dec. 3, 2003

(65) Prior Publication Data

US 2005/0124329 A1    Jun. 9, 2005

(51) Int. Cl.
*H04B 7/15* (2006.01)
(52) U.S. Cl. ............ 455/11.1; 455/426.1; 455/432.1; 455/436; 455/444; 455/448; 455/462; 455/464; 455/417; 370/331; 370/338; 370/466
(58) Field of Classification Search ............ 455/11.1, 455/426.1, 432.1, 432.2, 436, 444, 448, 462, 455/464, 417; 370/338, 331, 466
See application file for complete search history.

(56) References Cited

U.S. PATENT DOCUMENTS

| | | | | |
|---|---|---|---|---|
| 4,659,878 A | * | 4/1987 | Dinkins | 455/436 |
| 5,850,593 A | * | 12/1998 | Uratani | 455/11.1 |
| 5,890,054 A | * | 3/1999 | Logsdon et al. | 455/11.1 |
| 5,907,794 A | * | 5/1999 | Lehmusto et al. | 455/11.1 |
| 6,404,775 B1 | * | 6/2002 | Leslie et al. | 370/466 |
| 6,463,474 B1 | * | 10/2002 | Fuh et al. | 709/225 |
| 6,791,506 B2 | * | 9/2004 | Suganthan et al. | 343/795 |
| 2002/0058504 A1 | * | 5/2002 | Stanforth | 455/426 |
| 2002/0115455 A1 | * | 8/2002 | Umstetter et al. | 455/462 |
| 2002/0163895 A1 | * | 11/2002 | Haller et al. | 370/335 |
| 2004/0192193 A1 | * | 9/2004 | Silvester | 455/11.1 |
| 2004/0203342 A1 | * | 10/2004 | Sibecas et al. | 455/11.1 |

* cited by examiner

*Primary Examiner*—Steve M. D'Agosta
(74) *Attorney, Agent, or Firm*—David L. Guglielmi

(57) ABSTRACT

A method, apparatus and system for extending wireless network coverage is generally presented. In this regard, an extender agent is introduced to determine whether a wireless communication(s) was intended for a client(s) on an extended coverage network serviced by a client receiving the communication.

11 Claims, 2 Drawing Sheets

METHOD, APPARATUS AND SYSTEM FOR EXTENDING WIRELESS NETWORK COVERAGE

FIELD OF THE INVENTION

Embodiments of the present invention generally relate to the field of wireless networking, and, more particularly to a method, apparatus and system for extending wireless network coverage.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to a method, apparatus and system for extending wireless network coverage. In this regard, in accordance with but one example implementation of the broader teachings of the present invention, an extender agent is introduced. In accordance with but one example embodiment, the extender agent employs an innovative method to function as a wireless client for users of the system, while functioning as a wireless access point to one or more wireless clients. According to one example method, the extender agent may translate communication(s) between a primary network and an extended coverage network. According to another example method, the extender agent may facilitate extending coverage by transmitting communication(s) as received between client(s) and access point(s) too distant to communicate directly.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
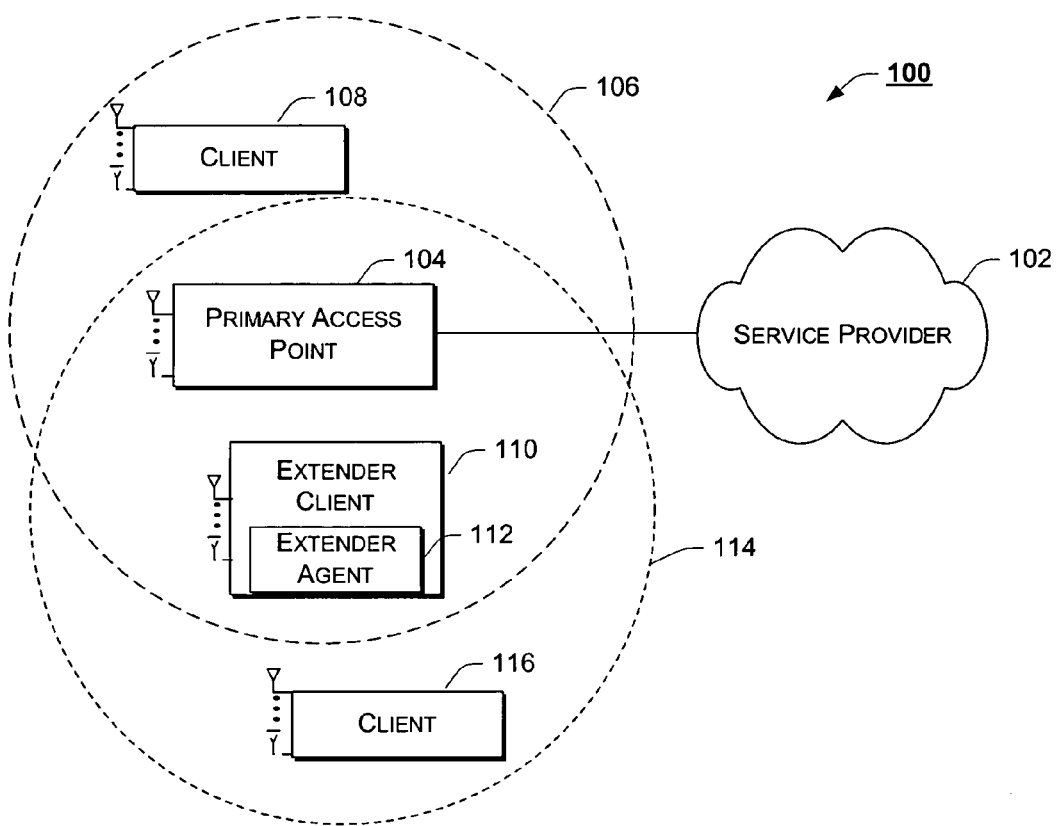
FIG. 1 is a block diagram of an example network environment suitable for implementing the extender agent, in accordance with one example embodiment of the invention.

FIG. 1 is a block diagram of an example network environment suitable for implementing the extender agent, in accordance with one example embodiment of the invention. In accordance with the illustrated example embodiment, network environment 100 may include one or more of a service provider 102, primary access point 104, primary network area 106, clients 108 and 116, extender client 110, extender agent 112, and extended coverage network area 114 coupled as shown in FIG. 1. Extender agent 112, as described more fully hereinafter, may well be used in electronic appliances and network environments of greater or lesser complexity than that depicted in FIG. 1. Also, the innovative attributes of extender agent 112 as described more fully hereinafter may well be embodied in any combination of hardware and software.

Service provider 102 may represent any medium and/or protocol to communicatively couple electronic devices. In one embodiment, service provider 102 may represent a cable modem or digital subscriber line (DSL) service providing internet access to a residence, although the invention is not limited in this regard. In another embodiment, service provider 102 may represent a local area network (LAN) in a corporate or other setting.

Primary access point 104 may represent any type of electronic appliance or device that has been configured to interface between client device(s) and service provider 102. In one embodiment, though the present invention is not so limited, primary access point 104 may represent a The Institute of Electrical and Electronics Engineers, Inc. (IEEE) 802.11b standard (approved Sep. 16, 1999, supplement to ANSI/IEEE Std 802.11, 1999 Edition) compliant wireless access point, although the invention is not limited in this regard. Primary access point 104 may provide suitably configured electronic appliances within a coverage area (e.g., client 108 and extender client 110) with access to service provider 102. In one embodiment, to extend the effective coverage area of the primary access point, primary access point 104 may communicate with remote client(s) (e.g., client 116) through an extender client 110, as explained more fully hereinafter.

Primary network area 106 may represent the maximum signal range for primary access point 104. Primary access point 104 may be limited to communicating with devices inside primary network area 106 (client 108 and extender client 110, for example). Though depicted as a two-dimensional circle for illustration purposes, primary network area 106 may be three-dimensional and may be any shape based on obstructions, terrain, and other factors. In one embodiment, though the present invention is not so limited, primary access point 104 may be located on the ground floor of a building, and primary network area 106 may extend to the second floor of the building (where extender client 110 may be located), but possibly not to the third floor of the building (where client 116 may be located).

Extender client 110 may represent any type of electronic appliance or device that hosts extender agent 112. In one embodiment, extender client 110 may be a computing device, such as, for example, a desktop or laptop computer. Extender client 110 may function as a client, for example providing internet access, while also functioning as an access point, for example enabling client 116 to access the internet through primary access point 104.

Extender agent 112 may have an architecture as described in greater detail with reference to FIG. 2. Extender agent 112 may also perform one or more methods for extending wireless network coverage of an access point (e.g., primary access point 104) from the primary network area to an extended network area, such as the method described in greater detail with reference to FIG. 3.

Extended coverage network area 114 may represent the maximum signal range for extender client 110. Extender client 110 may be limited to communicating with devices inside extended coverage network area 114 (client 116 and primary access point 104, for example). Though depicted as a two-dimensional circle for illustration purposes, extended coverage network area 114 may be three-dimensional and may be any shape based on obstructions, terrain, and other factors.

Clients 108 and 116 may represent laptop, desktop, or handheld computing devices or any other computing devices or appliances that can access network resources through a wireless network. As used herein, a wireless network generally represents any network wherein communications do not require the use of wires or cables. Examples of wireless networks include, but are not limited to, wireless local area networks (WLAN), wireless metropolitan area networks (WMAN), wireless wide are networks (WWAN), and wireless personal area networks (WPAN). Clients 108 and 116 may attempt to communicate with, or connect to, an access point from which it has received a broadcast communication.

Figure 2:
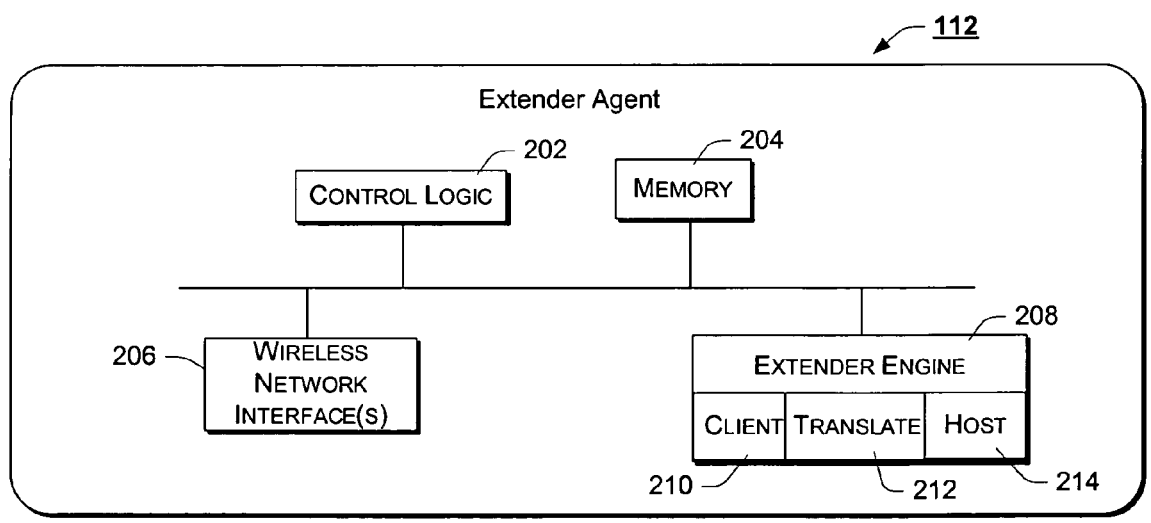
FIG. 2 is a block diagram of an example extender agent architecture, in accordance with one example embodiment of the invention.

FIG. 2 is a block diagram of an example extender agent architecture, in accordance with one example embodiment of the invention. As shown, extender agent 112 may include one or more of control logic 202, memory 204, wireless network interface(s) 206, and extender engine 208 coupled as shown in FIG. 2. In accordance with one aspect of the present invention, to be developed more fully below, extender agent 112 may include an extender engine 208 comprising one or more of client services 210, translate services 212, and/or host services 214. It is to be appreciated that, although depicted as a number of disparate functional blocks, one or more of elements 202–214 may well be combined into one or more multi-functional blocks. Similarly, extender engine 208 may well be practiced with fewer functional blocks, i.e., with only translate services 212, without deviating from the spirit and scope of the present invention, and may well be implemented in hardware, software, firmware, or any combination thereof. In this regard, extender agent 112 in general, and extender engine 208 in particular, are merely illustrative of one example implementation of one aspect of the present invention. As used herein, extender agent 112 may well be embodied in hardware, software, firmware and/or any combination thereof.

As introduced above, extender agent 112 may have the ability to extend the coverage of a primary wireless network area (for example 106) to an extended network coverage area (for example 114). In one embodiment, extender agent 112 may function as a typical access point, from the point of view of, e.g., client 116. In the same and other embodiments, extender agent 112 may function as a typical client, from the point of view of primary access point 104. It should be appreciated that extender agent 112 may well simultaneously operate as an access point in the service of certain clients (e.g., 116), while serving as a client to an end-user of extender agent 112.

As used herein control logic 202 provides the logical interface between extender agent 112 and its host extender client 110. In this regard, control logic 202 may manage one or more aspects of extender agent 112 to provide a communication interface from extender client 110 to wireless network communications, e.g., through wireless interface(s) 206 and one or more antenna(e). In one embodiment, control logic 202 may arbitrate access to wireless network interface(s) 206 between client services 210 and host services 214, possibly utilizing time-share techniques based on 802.11 request to send/clear to send (RTS/CTS) or CTS-To-Self. In some embodiments, control logic 202 may allow a single wireless network interface to be used by both these services by creating two "virtual" wireless network interfaces from the single physical wireless network interface. As used herein, a "virtual" network is intended to represent a listing or mapping of devices (i.e. clients, access points, etc.) perhaps maintained in software. As one example, though the claims are not so limited, extender agent 112 may perceive primary access point 104 and client 116 as belonging to two distinct "virtual" networks, even though all communications may occur through a single wireless network interface 206.

According to one aspect of the present invention, though the claims are not so limited, control logic 202 may receive event indications such as, e.g., receipt of a new wireless communication. Upon receiving such an indication, control logic 202 may selectively invoke the resource(s) of extender engine 208. As part of an example method for extending a wireless network coverage, as explained in greater detail with reference to FIG. 3, control logic 202 may selectively invoke client services 210 or host services 214 that may process client communications for extender client 110 or facilitate other communications (between primary access point 104 and client 116, for example), respectively. Control logic 202 also may selectively invoke translate services 212, as explained in greater detail with reference to FIG. 3, to translate communications between primary network area 106 and extended coverage network area 114. As used herein, control logic 202 is intended to represent any of a wide variety of control logic known in the art and, as such, may well be implemented as a microprocessor, a microcontroller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include volatile and non-volatile memory elements, possibly random access memory (RAM) and/or read only memory (ROM). Memory 204 may be used to store a network address translation (NAT) table(s) and/or other network traffic received from other network devices, for example 104 and 116.

Wireless network interface(s) 206 provides a path through which extender agent 112 can communicate with other network devices, for example 104 and 116. There may be a single wireless network interface and the use of virtualization to create two or more "virtual" interfaces or there may be two or more separate wireless network interfaces. Network interface 206 is intended to represent any of a wide variety of network interfaces and/or controllers known in the art. In one embodiment, two network interface controllers may be utilized; one to communicate on primary network area 106, and another to communicate on extended coverage network area 114. Where there are multiple network interface controllers, the controllers may be of different standards (e.g., one controller may be 802.11b compliant, while another controller may be 802.16 compliant, and still another controller may be compliant with some other standard). In another embodiment, a single network interface controller may be utilized to communicate on both primary network area 106 and extended coverage network area 114.

As introduced above, extender engine 208 may be selectively invoked by control logic 202 to process client communications for extender client 110, to translate communications between primary network area 106 and extended coverage network area 114, and to facilitate communications between primary access point 104 and client 116. In accordance with the illustrated example implementation of FIG. 2, extender engine 208 is depicted comprising one or more of client services 210, translate services 212 and host services 214. Although depicted as a number of disparate elements, those skilled in the art will appreciate that one or more elements 210–214 of extender engine 208 may well be combined without deviating from the scope and spirit of the present invention.

Client services 210, as introduced above, may provide extender agent 112 with the ability to function as a wireless client. In one example embodiment, client services 210 may allow extender client 110 to access the internet through primary access point 104. In another example embodiment, client services 210 may request network access from primary access point 104 on behalf of client 116.

As introduced above, translate services 212 may provide extender agent 112 with the ability to translate communications between primary network area 106 and extended coverage network area 114. Translate services 212 may translate between actual networks or "virtual" networks or a combination of actual and "virtual" networks. In one example embodiment, translate services 212 may maintain a network address translation (NAT) table(s) in memory 204 to map addresses in a primary network area to addresses associated with devices, agents, threads, etc in the extended network area. In another example embodiment, translate services 212 may manipulate the contents of communications, e.g., translating the content between a first network protocol and a second (or subsequent) network protocol. (e.g., between 802.11x network protocols or between an 802.16 network protocol and an 802.11x network protocol).

Host services 214, as introduced above, may provide extender agent 112 with the ability to facilitate communications between primary access point 104 and client 116. In one embodiment, host services 214 may function as a standard access point to client 116, performing functions such as beacon (or advertisement of extended coverage network area 114, using the same or a different SSID), client connection table maintenance, client authentication, dynamic host configuration protocol (DHCP) service, etc. In another example embodiment, host services 214 may rebroadcast communications from primary access point 104 and client 116 so that they can receive communications for each other.

Figure 3:
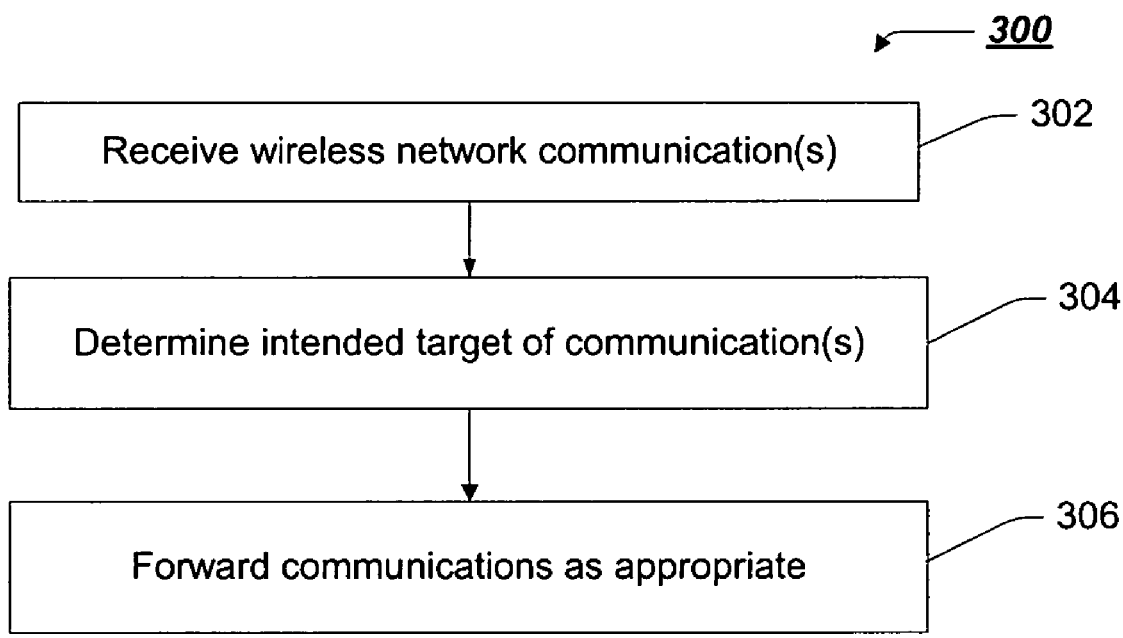
FIG. 3 is a flow chart of an example method for extending wireless network coverage, in accordance with one example embodiment of the invention.

FIG. 3 is a flow chart of an example method for extending wireless network coverage, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, the method of FIG. 3 begins with extender agent 112 receiving (302) wireless network communication(s). In one example embodiment, communications from client 116 requesting access to network resources may be processed by host services 214. In another example embodiment, communications from primary access point 104 may be processed by client services 210.

Next, extender agent 112 may determine (304) the intended target of the communication(s). In one example embodiment, communications received from primary access point 104 may have been sent in response to a forwarded request for network resources from client 116 and may be translated by translate services 212. In another example embodiment, communications received from primary access point 104 may have been in response to a request for network resources from extender client 110 and may be handed off to a requesting application executing on the host appliance 110.

Extender agent 112 may then selectively forward (306) at least a subset of received communication(s) to remote client(s), as appropriate. The transmitting of communications by wireless network interface(s) 206 may be managed by control logic 202 to time-share a single physical wireless network interface between two virtual interfaces. In one example embodiment, communications for client 116 from primary access point 104 may be sent by host services 214. In another example embodiment, communications for primary access point 104 from client 116 may be sent by client services 210.

Figure 4:
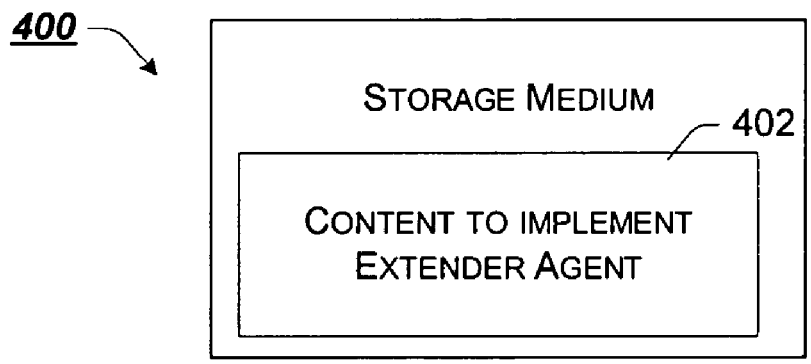
FIG. 4 is a block diagram of an example article of manufacture including content which, when accessed by a device, causes the device to implement one or more aspects of one or more embodiment(s) of the invention.

FIG. 4 illustrates a block diagram of an example storage medium comprising content which, when accessed, causes an electronic appliance to implement one or more aspects of the extender agent 112 and/or associated method 300. In this regard, storage medium 400 includes content 402 (e.g., instructions, data, or any combination thereof) which, when executed, causes the appliance to implement one or more aspects of extender agent 112, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. An electronic appliance, comprising:
   one or more dipole antenna(e);
   one or more wireless network interface(s), coupled with the one or more dipole antenna(e), to communicate with other devices; and
   an extender engine coupled with the wireless network interface(s), the extender engine to function as a client to a first wireless network access point and the extender engine to function as a second wireless network access point to one or more other client(s), including performing one or more functions chosen from the group consisting of beacon, client connection table maintenance, client authentication, and dynamic host configuration protocol (DHCP) service;
   wherein the extender engine functions as a second access point to one or more other client(s) sends and receives communications between client(s) on an extended coverage network and resource(s) on a primary network; and
   wherein the extender engine sends and receives communications between client(s) on an extended coverage network and resource(s) on a primary network translates the communication(s) between the primary network and the extended coverage network; and
   wherein the extender engine translates the communication(s) between the primary network and the extended coverage network translates the communication(s) between a first network protocol and a second network protocol.

2. The electronic appliance of claim 1, wherein the extender engine to send and receive communications between client(s) on an e~tcnded coverage network and resource(s) on a primary network comprises: the extender engine to transmit the communication(s) as received.

3. The electronic appliance of claim 1, wherein the extender engine to translate the communication(s) between the primary network and the extended coverage network comprises: the extender engine to utilize a network address translation (NAT) table(s) to determine for which client(s) the communication(s) was intended.

4. A storage medium comprising content which, when executed by an accessing machine, causes the accessing machine to function as a client to a first wireless network access point and to function as a second wireless network access point to one or more other client(s), including performing one or more functions chosen from the group consisting of: beacon, client connection table maintenance, client authentication, and dynamic host configuration protocol (DHCP) service;
   wherein said accessing machine comprises:
      one or more dipole antenna(e);
      one or more wireless network interface(s), coupled with the one or more dipole antenna(e), to communicate with other devices; and
      an extender engine coupled with the wireless network interface(s), the extender engine to function as a client to a first wireless network access point and the extender engine to function as a second wireless network access point to one or more other client(s), and
         wherein the extender engine to function as a second access point to one or more other client(s) sends and receives communications between client(s) on an extended coverage network and resource(s) on a primary network; and
         wherein the extender engine sends and receives communications between client(s) on an extended coverage network and resource(s) on a primary network translates the communication(s) between the primary network and the extended coverage network; and
         wherein the extender engine translates the communication(s) between the primary network and the extended coverage network translates the communication(s) between a first network protocol and a second network protocol.

5. The storage medium of claim 4, wherein the content to send and receive communications between client(s) on an extended coverage network and resource(s) on a primary network comprises content which, when executed by the accessing machine, causes the accessing machine to transmit the communication(s) as received.

6. The storage medium of claim 4, wherein the content to translate the communication(s) between the primary network and the extended coverage network comprises content which, when executed by the accessing machine, causes the accessing machine to utilize a network address translation (NAT) table(s) to determine for which client(s) the communication(s) was intended.

7. An apparatus, comprising:
one or more dipole antenna(e);
one or more wireless network interface(s), coupled with the dipole antenna(e), to communicate with other devices; and
control logic extender engine coupled with the wireless network interface(s), the control logic extender engine to function as a client to a first wireless network access point and the control logic extender engine to function as a second wireless network access, point to one or more other client(s), including performing one or more functions chosen from the group consisting of: beacon, client connection table maintenance, client authentication, and dynamic host configuration protocol (DHCP) service;
wherein the extender engine to function as a second access point to one or more other client(s) sends and receives communications between client(s) on an extended coverage network and resource(s) on a primary network; and
wherein the extender engine sends and receives communications between client(s) on an extended coverage network and resource(s) on a primary network translates the communication(s) between the primary network and the extended coverage network; and
wherein the extender engine translates the communication(s) between the primary network and the extended coverage network translates the communication(s) between a first network protocol and a second network protocol.

8. The apparatus of claim 7, wherein the control logic extender engine to function as a second access point complies with the IEEE 802.11 specification.

9. The apparatus of claim 8, further comprising the control logic extender engine to create two or more virtual networks.

10. The apparatus of claim 9, further comprising the control logic extender engine to time-share one wireless network interface between two or more virtual networks.

11. The apparatus of claim 10, wherein the control logic extender engine to time-share utilizes one or more of 802.11 RTS/CTS and CTS-To-Self techniques.

\* \* \* \* \*